US008000372B1

United States Patent
Austin et al.

(10) Patent No.: US 8,000,372 B1
(45) Date of Patent: Aug. 16, 2011

(54) TRAVELING-WAVE LASER HAVING A RESONATOR INCLUDING A DIRECTION-SENSITIVE INTERFEROMETER FOR ESTABLISHING UNIDIRECTIONAL CIRCULATION

(75) Inventors: R. Russel Austin, Cool, CA (US); Andrea Caprara, Palo Alto, CA (US)

(73) Assignee: Coherent, Inc., Santa Clara, CA (US)

( * ) Notice: Subject to any disclaimer, the term of this patent is extended or adjusted under 35 U.S.C. 154(b) by 451 days.

(21) Appl. No.: 12/235,790

(22) Filed: Sep. 23, 2008

(51) Int. Cl.
*H01S 3/083* (2006.01)
*H01S 3/081* (2006.01)
*H01S 3/08* (2006.01)

(52) U.S. Cl. .................. 372/94; 372/93; 372/99

(58) Field of Classification Search .................. None
See application file for complete search history.

(56) References Cited

U.S. PATENT DOCUMENTS

| 4,222,668 | A | * | 9/1980 | Henry | 356/472 |
|---|---|---|---|---|---|
| 5,052,815 | A | | 10/1991 | Nightingale et al. | 372/94 |
| 5,119,383 | A | * | 6/1992 | Duling et al. | 372/18 |
| 6,563,845 | B2 | * | 5/2003 | Kumkar | 372/28 |
| 6,940,880 | B2 | | 9/2005 | Butterworth et al. | 372/22 |
| 2005/0163187 | A1 | | 7/2005 | Spinelli et al. | 372/94 |

OTHER PUBLICATIONS

U.S. Appl. No. 12/221,219, filed Jul. 31, 2008, entitled "Stabilized Near-Infrared Laser," by Keith M. Murdoch, 14 pages in length.

\* cited by examiner

*Primary Examiner* — Jessica Stultz
*Assistant Examiner* — Sean Hagan
(74) *Attorney, Agent, or Firm* — Morrison & Foerster LLP

(57) ABSTRACT

A laser includes a traveling-wave ring-resonator in which one resonator mirror is a mirror of an interferometer arranged such that, when the interferometer is operated in an anti-resonant condition, the mirror has a greater effective reflectivity for clockwise circulation of light in the resonator than for anticlockwise circulation of light in the resonator. There is a difference between the clockwise and anticlockwise effective-reflectivity sufficient that lasing in the resonator is possible only in the clockwise direction.

18 Claims, 8 Drawing Sheets

TRAVELING-WAVE LASER HAVING A RESONATOR INCLUDING A DIRECTION-SENSITIVE INTERFEROMETER FOR ESTABLISHING UNIDIRECTIONAL CIRCULATION

TECHNICAL FIELD OF THE INVENTION

The present invention relates in general to traveling-wave lasers including a ring-resonator in which an optical-diode is used to force lasing in only one circulation-direction. The invention relates in particular to lasers including a traveling-wave ring-resonator in which a high-circulating power is required, or which operates at a fundamental wavelength for which optical-diodes have substantial losses.

DISCUSSION OF BACKGROUND ART

A traveling-wave ring-resonator is often used in a laser which must operate in a single longitudinal mode, with very low noise. A laser incorporating such a resonator is also useful for providing pump-radiation for optical parametric frequency conversion (frequency division).

Typically a traveling wave ring-resonator includes what is usually termed by practitioners of the art as an "optical-diode." One such an optical-diode includes a crystal of a magneto-optic material such as terbium gallium garnet (TGG) or an element of terbium-doped glass. The magneto-optic material is used as a unidirectional polarization rotator, in conjunction with polarization selective elements in the resonator, to provide a loss in one direction of circulation in the resonator that is greater than the loss in the opposite direction. This differential loss forces lasing to occur in the resonator only in the direction of circulation in which the loss is least Optical-diodes are most effective in a wavelength range between about 400 nanometers (nm) and 1100 nm. The effectiveness of an optical-diode depends on a so-called "Verdet" constant of the magneto-optic material. This constant defines a degree of polarization-rotation, per unit length of the material, per unit applied magnetic field. The Verdet constant for any given material is wavelength-sensitive, and generally decreases with increasing wavelength. In order to compensate for a lower Verdet constant, the path length in the magneto-optic material must be increased, which increase absorption of radiation in the material. This increases the insertion loss of the optical-diode and reduces the power handling capability of the optical-diode due to heating caused by the absorption. Optical-diodes are commercially available that can operate at wavelengths up to about 2,000 nm, i.e., about 2.0 micrometers (μm). These, however, have an insertion (absorption) loss of about 7% or more, and, because of the absorption, can handle radiation power of only about 20 Watts (W) or less. There is a need for a means for causing unidirectional radiation-circulation in a ring-resonator without the use of a prior-art optical-diode.

SUMMARY OF THE INVENTION

In one aspect of the present invention a laser comprises a traveling-wave ring-resonator formed by a plurality of resonator mirrors. The resonator has first and second, opposite, possible circulation-directions for light circulating therein. A first of the plurality of resonator mirrors is one mirror of an interferometer including a plurality of interferometer mirrors and capable of being operated in an anti-resonant state. The interferometer includes a magneto-optic element and a polarization-rotating element arranged such that when the interferometer is operated at about the anti-resonant state, the first of the plurality of resonator mirrors has an effective reflectivity greater in the first circulation-direction of the resonator than in the second circulation-direction of the interferometer.

In one preferred embodiment of the inventive laser, the interferometer is a ring-interferometer and there is a difference between the first-direction reflectivity and the second direction reflectivity such that lasing occurs only in the first circulation direction. A fraction of the light circulating in the ring-resonator circulates in the ring-interferometer. The intensity of light circulating in the ring-interferometer is about 10% of the intensity of light circulating in the resonator.

By way of example, this approach provides an advantage that a magneto-optic element that is rated for only about 20 W can be used in the inventive interferometer to provide unidirectional circulation in a resonator in which the intensity of circulating light is about 200 W. Other aspects and advantages of the present invention will be evident to those skilled in the art from the detailed description of the invention set-fort below.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
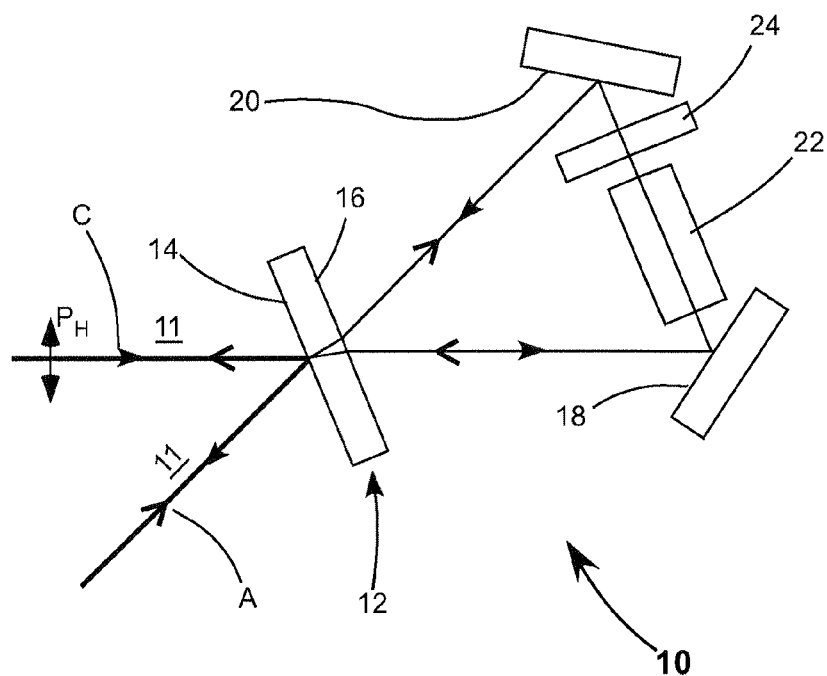
FIG. 1 schematically illustrates a preferred embodiment of a direction-sensitive interferometer in accordance with the present invention in the form of a ring-interferometer including a partially reflective partially transmissive input/output coupling mirror and two maximally reflecting mirrors, with a magneto-optic element and a birefringent polarization rotator located in the interferometer.

Referring now to the drawings, wherein like components are designated by like reference numerals, FIG. 1 schematically illustrates a preferred embodiment 10 of a direction-sensitive interferometer in accordance with the present invention. Interferometer 10 is a ring-interferometer formed by mirrors 12, 18, and 20. Mirror 12, is the input and output coupler for the interferometer 10. The mirror has a partially reflective and partially transmissive surface 14, and an anti-reflection-coated surface 16. This mirror is intended to serve as a resonator mirror in a ring-resonator in which interferometer 10 is incorporated. This resonator is designated by underlined numeral 11 in FIG. 1, and is only depicted in part. Those skilled in the art will recognize that a ring-resonator can be formed by as few as three mirrors, but is usually configured with four or more mirrors for providing a particular mode-shape cooperative with elements such as gain-elements or frequency-conversion elements in the resonator. The present invention is not limited to use in a ring-resonator formed from any particular number or configuration of mirrors.

Located in interferometer 10 are a magneto-optic (Faraday) element 22 and a half-wave plate (polarization-rotator) 24. Faraday-element 22 is adjusted to provide polarization rotation for radiation (light) circulating in a counterclockwise (anticlockwise) direction in interferometer 10, which light would be sampled from light circulating in a clockwise direction in a resonator 11 and indicated by solid arrowheads.

In this embodiment of the inventive interferometer, half-wave plate 24 is adjusted such that polarization-rotation introduced by Faraday-element 22 for anticlockwise-circulating light is canceled by half-wave plate 24, so that this light is in the same polarization plane as light circulating in resonator 11. The polarization of clockwise-circulating light is rotated by half-wave plate receives and rotated again by Faraday Element 22, so that the two rotations add, rather than cancel, and the net rotation is twice the one introduced by the Faraday-element alone. This light returning to partially transmitted mirror has a polarization-plane that is tilted with respect to that of light circulating in resonator 11.

Figure 2:
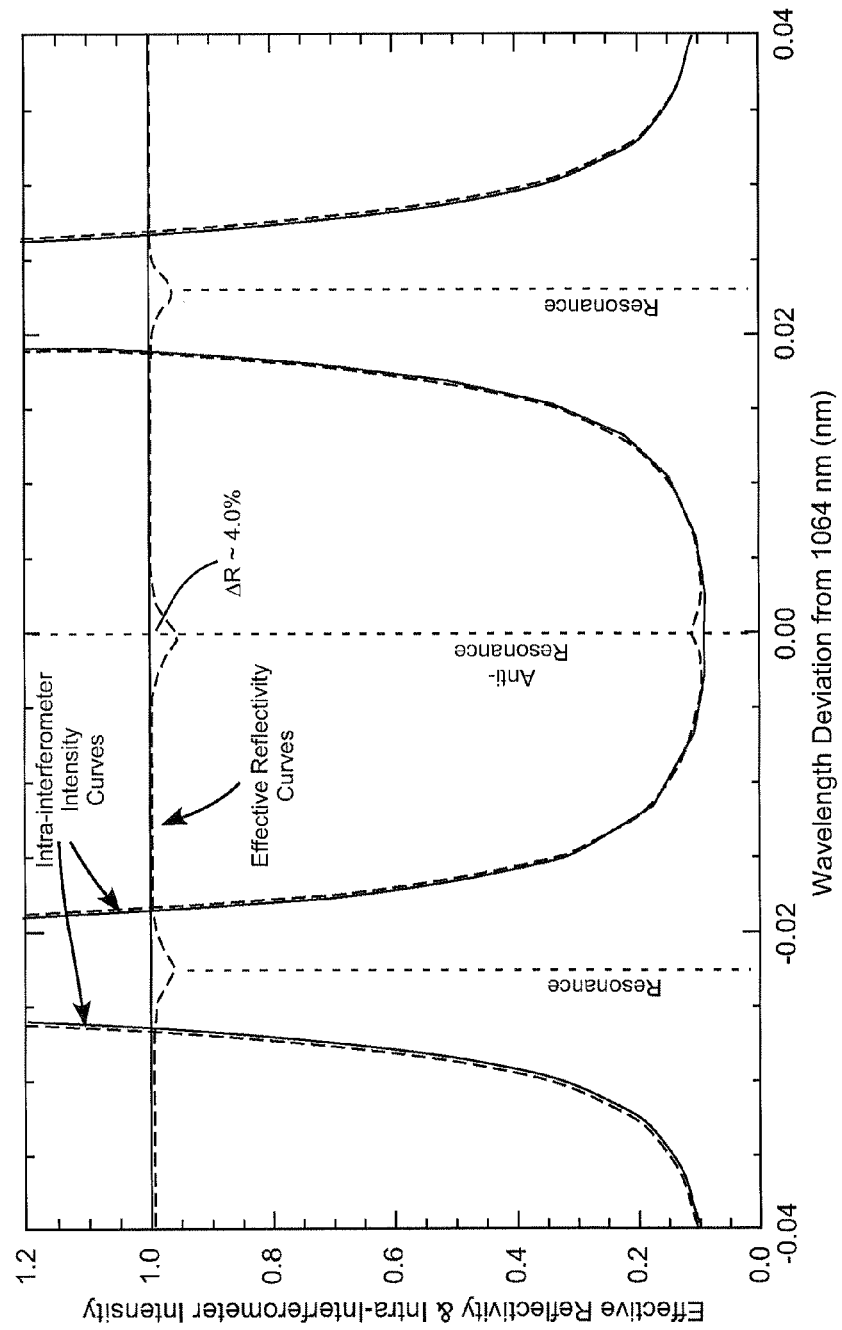
FIG. 2 is a graph schematically illustrating calculated intra-interferometer intensity and effective reflectivity of the input/output coupling mirror for clockwise and anticlockwise circulation in the interferometer, assuming that the magneto-optic element is lossless.

The effect of the differential polarization rotation in interferometer 10 is illustrated graphically in FIG. 2, which schematically and hypothetically depicts calculated effective reflectivity of mirror 12, i.e., surface 14 thereof, and intra-interferometer (intra-ring) circulating intensity as a function of deviation from a nominal wavelength of circulating-light of 1064 nm. This can be equated to a deviation of intra-interferometer path length from an anti-resonant path length in the interferometer at the nominal wavelength. The results for light circulating anticlockwise in the interferometer are depicted by solid curves. The results for light circulating clockwise in the interferometer are depicted by dashed curves. The term "hypothetical" is used above in connection with the graph of FIG. 2 as the intra-interferometer intensity results assume that the source of the circulating light is unaffected by the state of the interferometer, which in practice is not, nor intended to be, the case.

In the calculation for the graph of FIG. 2, it is assumed that Faraday-element 22 is assumed to be TGG material providing 6° of polarization rotation in one direction, and that half-wave plate is adjusted to provide 6° of polarization rotation in the opposite direction. It is also assumed that there is no loss in the Faraday-element, and that mirror 12 (surface 14) has a reflectivity of 70% (0.7) and a transmission of 30% (0.3). The input intensity to the interferometer is assumed to be 1.0

It can be seen that in the case of light circulating anticlockwise in the interferometer with no net polarization-rotation on returning to mirror 12, the effective reflectivity of mirror 12 for light circulating clockwise in resonator 11, is 100% (1.0) at all states of the interferometer between an anti-resonant state and adjacent resonant states. In the anti-resonant state of interferometer 10, the intra-interferometer intensity for counter-clockwise circulating light is less than 10% of the input intensity. In the resonant case, of course, the intra-interferometer intensity is greater than the input intensity because of the resonant reinforcement.

Because of the tilt of the polarization plane induced by half-wave plate 24, the effective reflectivity of mirror 12 for light circulating counter-clockwise in resonator 11 is reduced to between about 95% (0.95) and 96% (0.96) in relatively narrow regions about the anti-resonant and resonant states of the interferometer. This means that there would be between about 4% and 5% greater loss in resonator 11 for light circulating counterclockwise therein than for light circulating clockwise therein. It should be noted here that the reflectivity is computed for incident light linearly polarized in the plane of the ring (in the plane of the drawing of FIG. 1), as the ratio between horizontally polarized reflected power and incident power.

In accordance with the principle of a laser resonator preferring to lase in the condition of least loss, this difference in reflectivity is more than sufficient, in the case of a ring-resonator including no other lossy elements, to ensure that light will only circulate in one direction therein. The loss difference required is usually about 2% or greater. Accordingly, using the inventive interferometer in an anti-resonant state as a resonator-mirror in such a ring-resonator, unidirectional circulation can be achieved with magneto-optic material exposed to less than 10% of the power that such material would be exposed to if used in a prior-art intra-resonator optical-diode for providing unidirectional operation.

Calculations indicate that increasing the reflectivity of mirror 12 would reduce the circulating power in the ring to values even smaller than the 10% of incident power achieved with a 70% reflectivity. This would be achieved, however, with a narrowing of the range of wavelengths over which the difference existed, possibly making the interferometer unacceptably sensitive to path length changes in the interferometer. The effective-reflectivity difference at anti-resonance is not, however, greatly affected by the reflectivity of mirror 12, and is determined principally by the total rotation-angle of the Faraday element.

It should be noted, here, for completeness of description, that in a "real" case of the graph of FIG. 2 (wherein the input source would be affected by the state of the interferometer) the intra-interferometer intensity condition would not be exactly as depicted. In this real case, as the interferometer was swept through the anti-resonant state thereof, the intensity of light circulating clockwise in the interferometer would drop abruptly to zero (as circulation changed from bi-directional to unidirectional). This would be accompanied by a corresponding doubling of the intensity of counter-clockwise circulating light. However, the intensity of the counter-clockwise circulating light would still be less than 10% of the input intensity.

Now, as one objective of the current invention is to be able to operate a unidirectional ring-resonator at wavelengths for which presently available Faraday-elements in the length required would have significant losses, the calculations of FIG. 2 were repeated with a loss of 7% (0.07) arbitrarily introduced into the Faraday-element. This assumed to be about the loss that TGG material would introduce in sufficient length to provide a polarization-rotation of about 6° at a wavelength of about 2.0 µm. The results of these calculations are schematically graphically depicted in FIG. 3. The notation for circulating-directions and assumptions are the same as those for the graph of FIG. 2, except for the Faraday-element losses. It should be noted that for many ring-resonators lasing would not be possible, in any direction, if the resonator included a conventional optical-diode having an insertion loss of 7%.

Figure 3:
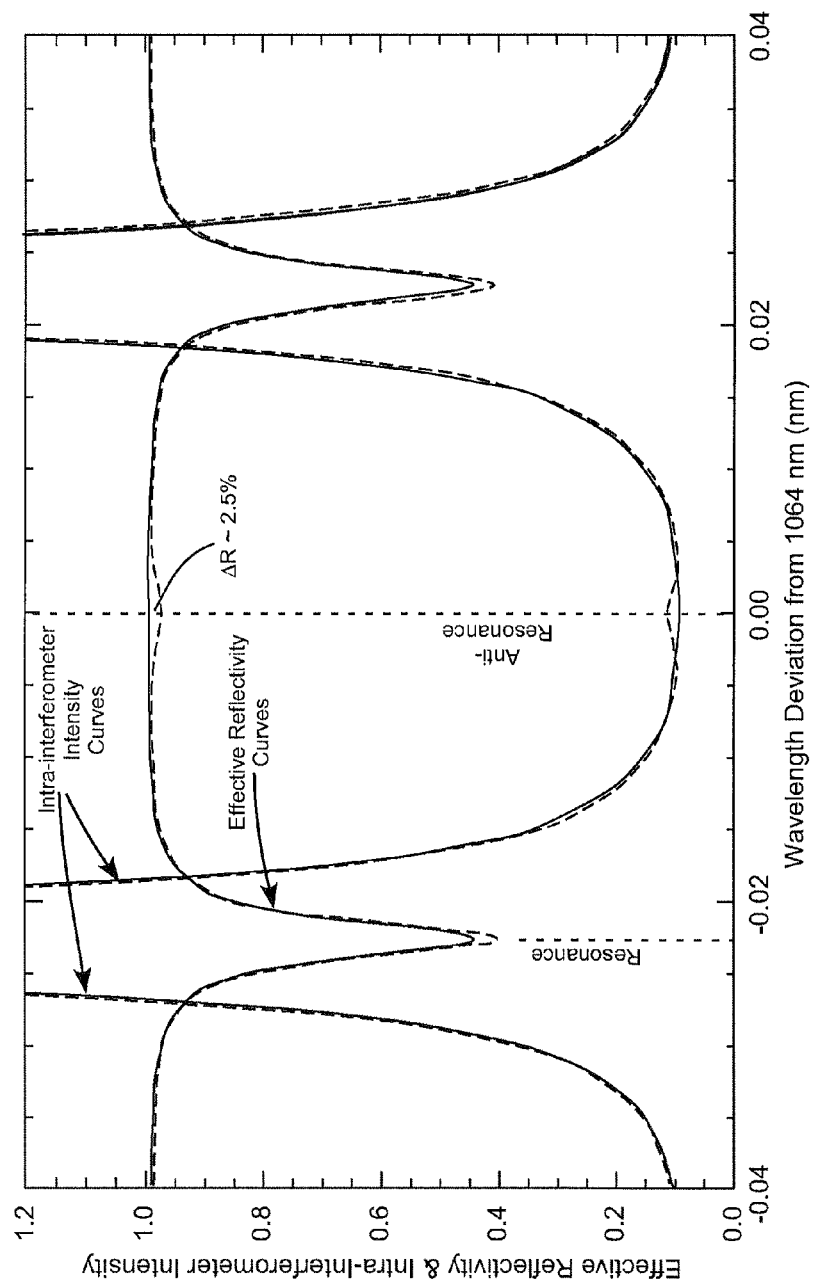
FIG. 3 is a graph schematically illustrating calculated intra-interferometer intensity and effective reflectivity of the input/output coupling mirror for clockwise and anticlockwise circulation in the interferometer, assuming 7% insertion loss for the magneto-optic element.

It can be seen from the curves of FIG. 3 that one effect of the 7% loss in the Faraday-element is to reduce the effective reflectivity of mirror 12, at anti-resonance, for clockwise circulation in resonator 11 by slightly less than one percent, while reducing the effective-reflectivity difference between clockwise and anticlockwise directions to about 2.5%. This difference, however, is still sufficient in most ring-resonators to provide unidirectional operation. The intra-resonator intensity is essentially unchanged at less that 10% of the input-intensity. That means that a Faraday-element having 7% insertion-loss and rated for only about 20.0 W operating-power could be used, in the inventive interferometer, to provide unidirectional operation in a resonator with about 200.0 W circulating power. Interesting also is that, at resonance, the effective reflectivity for both directions is so low that for most ring-resonators lasing would not be possible at all in any direction. This means that the interferometer would be unlikely to stray into a condition wherein intra-interferometer circulating power were sufficient to damage the Faraday-element.

It is preferable that the optical path (round-trip) length in the inventive interferometer be kept as short as possible. This maximizes the free-spectral range of the interferometer and minimizes the effect of changes in the path length due to environmental and other factors. This also minimizes possible differences between the dimensions of a beam incident on the interferometer and a beam exiting the interferometer.

Those skilled in the art will recognize that no matter how dimensionally stable the mechanical arrangement of the mirrors is made that temperature changes in transparent optical elements in the interferometer can change the optical path. Accordingly, it is preferable that an interferometer in accordance with the present invention be provided with some closed-loop means of controlling the optical path therein and actively maintaining the interferometer in an anti-resonant state.

One commonly used method for maintaining a ring-resonator in a resonant condition is to sample the condition in the resonator, determine the polarization-state of the sample by producing an error signal that provides a zero-crossing at resonance, and using the error signal cooperative with a piezoelectric mount to adjust the path length of the resonator to the resonant condition. This well-known method is usually referred to as the Hänsch-Couillaud method by practitioners of the art. (See: Laser frequency stabilization by polarization spectroscopy of a reflecting reference cavity, Hansch and Couillaud, Optics Communications. Vol. 35, No. 3 p. 441-4, incorporated herein by reference.)

In the inventive ring-interferometer the light circulating in the interferometer that represents the desired direction of circulation in the resonator, of which the interferometer is part, is the light that should be sampled. In interferometer 10 of FIG. 1, however, this light is always plane-polarized as the path length of the interferometer is swept through the anti-resonant condition. Here, a Hänsch-Couillaud analysis would always yield a zero signal, whatever the state of the interferometer. For light circulating in the opposite (unwanted) direction the polarization state varies from elliptically through plane (at anti-resonance) and back to elliptical as the path length of the interferometer is swept through an anti-resonance length.

It has been determined, however, that if the plane of the input polarization to the interferometer is slightly tilted (rotated) from the plane established in the resonator, for example by as little as one degree, by means of an additional half wave plate external to the interferometer, and if the half-wave plate inside the interferometer is adjusted to provide an additional rotation equal to minus the input rotation, while leaving the rotation provided by the Faraday element the same; the polarization-state in the resonator for light circulating in the desired direction will be plane at resonance and anti-resonance, and elliptical in all other states. This allows the Hänsch-Couillaud analysis to be used to actively control the path length of the interferometer. In this arrangement the interferometer will act, additionally as a polarization rotator providing a net tilt on output in the opposite direction to the input tilt. This will cancel the input tilt at the output of the interferometer, so that the polarization plane, horizontal prior to the external wave plate, will be horizontal again after the interferometer.

Figure 4:
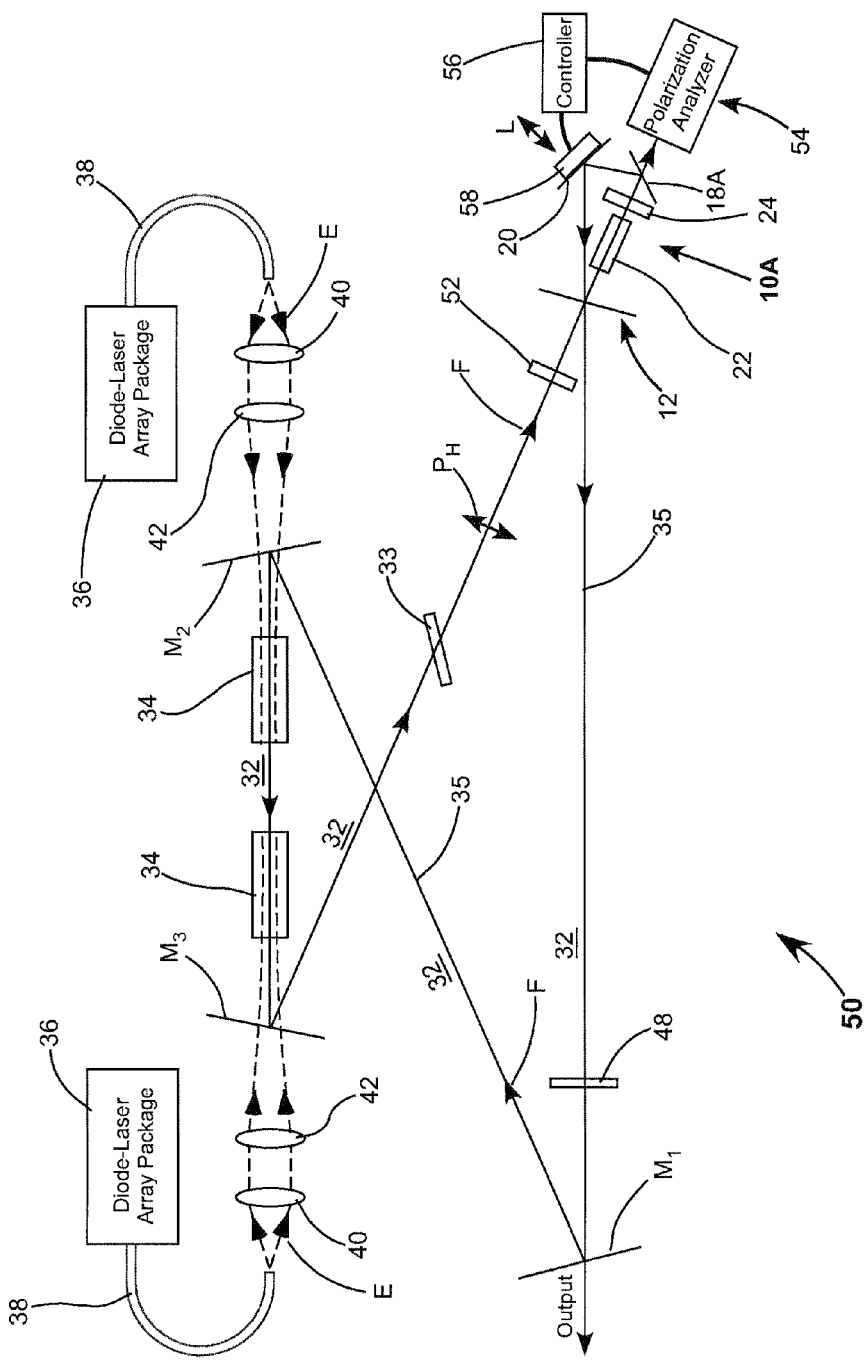
FIG. 4 schematically illustrates one preferred embodiment of laser in accordance with the present invention including a traveling-wave laser-resonator including a ring-interferometer similar to the ring-interferometer of FIG. 1 but wherein the interferometer has one mirror microscopically movable for adjusting the optical path length in the ring and a polarization analyzer and controller are provided for analyzing the state of the interferometer and maintaining the interferometer in an anti-resonant state by moving the movable mirror.

FIG. 4 schematically illustrates a ring-laser 50 in accordance with the present invention. Laser 50 includes a ring resonator 32 in a configuration commonly referred to by practitioners of the art as a "bow-tie" configuration. Resonator 12 is formed by mirrors $M_1$, $M_2$, $M_3$, and mirror 12 of an interferometer 10A in accordance with the present invention. Interferometer 10A is configured as described above for active control of the interferometer using a Hänsch-Couillaud scheme that is described in detail further hereinbelow.

Two solid state gain-elements 34, for example gain-elements of neodymium orthovanadate ($Nd:YVO_4$), are included in the resonator between mirrors $M_2$ and $M_3$. Each gain-element 34 is continuous-wave (CW) optically pumped (energized) by a beam of pump-light E from a corresponding diode-laser fiber-array package (diode-laser FAP) 36. The pump-light is delivered from each of the diode-laser FAPs via a fiber bundle or a multi-mode transport fiber 38. Light from the transport fiber is collimated by a lens 40 and focused by a lens 42 to a beam-waist in the corresponding gain-element 34. The wavelength of pump-light P is preferably selected to match the wavelength of an absorption peak of the gain-medium, for example the 808 nm peak of $Nd:YVO_4$.

As a result of optically pumping of the gain-medium, fundamental radiation F, having a wavelength of 1064 nm circulates in resonator 32 generally along a path 35 designated by a solid line in FIG. 4. An etalon 48 in the form of an uncoated plate of a relatively high index material that is transparent at the fundamental wavelength is configured to limit possible oscillating modes of the resonator by transmitting one mode with lower losses than modes adjacent thereto. The etalon can be thought of as shaping the gain-bandwidth profile of the gain-element. A Brewster-angle plate 33 is included for defining a polarization-plane of the resonator as indicated by arrows $P_H$.

Mirrors $M_2$, and $M_3$ are each highly reflective, for example greater than 99.8% reflective, for fundamental radiation F and are highly transmissive, for example greater than 95% transmissive, at the wavelength of pump-light P. Mirror $M_1$ is partially reflective and partially transmissive, for example about 90% reflective and 10% transmissive for fundamental radiation F and serves as an out-coupling mirror for the fundamental wavelength radiation of the resonator, which radiation is the intended CW output of laser 50. Mirror 12 of interferometer 10A is about 70% reflective and 30 percent transmissive for the fundamental radiation. However, this mirror has effectively greater than 99.5% reflectivity for the fundamental radiation because of the action of interferometer 10A. A half-wave plate 52 is provided in resonator 32 to slightly tilt the polarization-plane of the radiation incident on mirror 12, as discussed above with reference to active control of an interferometer in accordance with the present invention.

The following differences between interferometer 10A and interferometer 10 of FIG. 1 should be noted. Faraday-element 22 and half-wave plate 24 are located between mirror 12 and mirror 18A, merely for convenience. Mirror 18A of interferometer 10A differs from mirror 18 of interferometer 10 inasmuch as mirror 18A is coated to be about 0.1% percent transmissive, in order to provide a sample of radiation circulating in the desired (indicated) direction in interferometer 10A for analysis by a polarization-analyzer 54.

An error-signal generated by the polarization-analyzer is communicated to a controller 56. Controller 56, in response to the sign, i.e., positive or negative, of error-signal activates a piezoelectric element 58 to move mirror 20 in or out as indicated by arrows L to maintain the signal at zero and maintain the interferometer in an anti-resonant state. The relationship of the sign of the signal to the direction of motion is easily determined by experiment. The extent of motion necessary for maintaining anti-resonance in the interferometer is negligible compared to the width of a circulating beam in the interferometer. Accordingly the movement of the mirror does not adversely affecting the alignment of the interferometer.

Those skilled in the art will recognize that the Hänsch-Couillaud signal also makes a zero crossing at resonance points, but in the opposite direction to the crossing at anti-resonance points. Accordingly, whatever sign convention is adopted for driving mirror 20 in and out to stabilize the interferometer at anti-resonance, that sign convention will prevent the path length of the interferometer from being adjusted to a resonant state.

Figure 5:
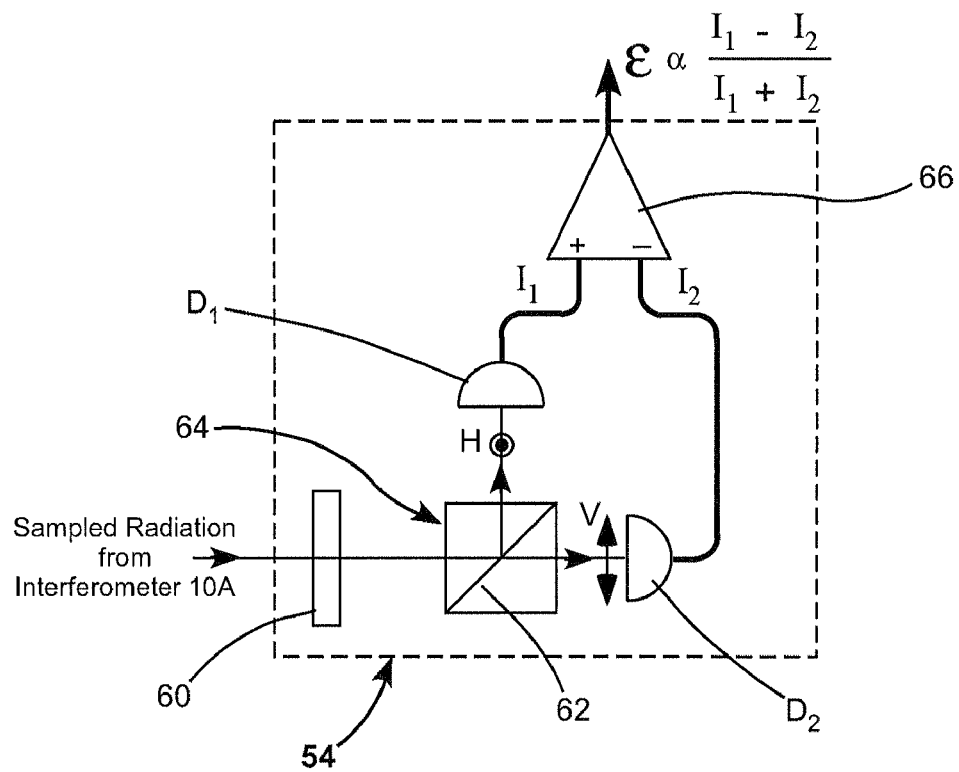
FIG. 5 schematically illustrates one example preferred arrangement of the polarization analyzer of FIG. 4.

FIG. 5 schematically illustrates one preferred arrangement of polarization analyzer 54. Sampled radiation from mirror 18A of interferometer 10A is incident on a quarter-wave plate 60. The sampled radiation will be plane-polarized when the interferometer is in an anti-resonant (or resonant) state and elliptically polarized to some degree in any other state After transmission through plate 60, the beam sample is separated by an internal polarizing beamsplitter 62 surface of a bi-prism 64, into two plane-polarized components, with orthogonally-opposed polarization-plane orientations indicated by arrowhead H and double arrow V. Components H and V are incident on detectors $D_1$ and $D_2$ respectively. Detectors $D_1$ and $D_2$ provide signals having magnitudes $I_1$ and $I_2$, respectively, dependent on the intensities of the corresponding components H and V. Signals $I_1$ and $I_2$ are delivered to a differential amplifier 66. Differential amplifier 66 generates an error signal c proportional to $(I_1-I_2)/(I_1+I_2)$.

Figure 6:
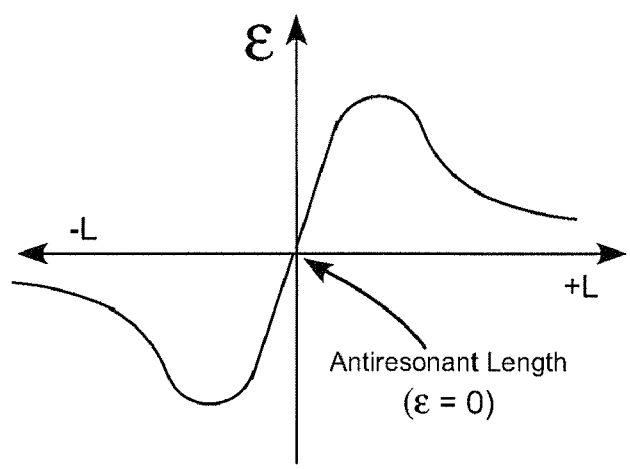
FIG. 6 is a graph schematically illustrating an error signal generated by the polarization controller as a function of path length change in the interferometer. Of FIG. 4

FIG. 6 is a graph schematically illustrating the form of signal $\epsilon$ as a function of the deviation L from an anti-resonant condition. If the sampled beam is plane-polarized before transmission through quarter-wave plate 60, i.e., if the resonator is in an anti-resonant (or resonant) condition, transmission through plate 60 will cause the sampled beam to be circularly polarized. In this case signals $I_1$ and $I_2$ will be equal, and $\epsilon$ will be zero. For all other conditions of the interferometer, the sample beam will be elliptically polarized before and after transmission through plate 60. In these conditions, $I_1$ and $I_2$ will be unequal, and $\epsilon$ will be non-zero with a sign dependent on which side of the anti-resonant condition the interferometer is at. Signal $\epsilon$ is fed to controller 56 (see FIG. 4) which adjusts piezoelectric element to drive epsilon back to zero and maintain the interferometer at anti-resonance as discussed above.

Figure 7:
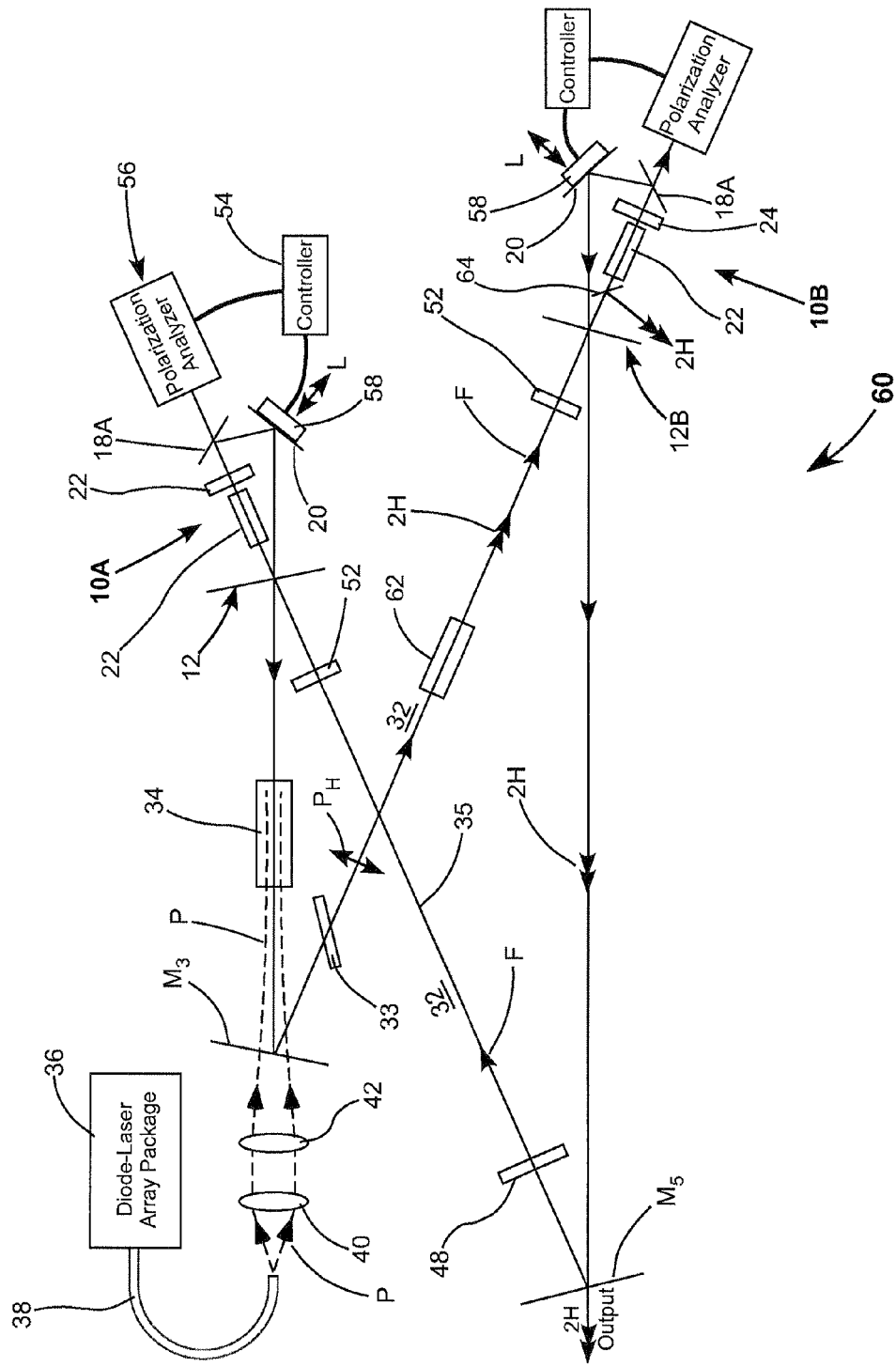
FIG. 7 schematically illustrates another preferred embodiment of laser in accordance with the present invention, similar to the laser of FIG. 4, but wherein the traveling-wave resonator includes an optically nonlinear crystal arranged for doubling the frequency of fundamental radiation circulating in the laser resonator and wherein the traveling-wave resonator includes first and second ones of the ring-interferometer of FIG. 4.

FIG. 7 schematically illustrates another embodiment 60 of a traveling-wave ring-laser in accordance with the present invention. Laser 60 is similar to laser 70 with exceptions as follows. Resonator 32 includes only one gain-element 34 with correspondingly only one arrangement for delivering pump-radiation to the gain-element. An optically nonlinear crystal 62 is included in the resonator and arranged to convert a portion of circulating fundamental radiation F to second-harmonic (2H) radiation having a wavelength one-half that of the fundamental radiation, i.e., having a frequency twice that of the fundamental radiation. The second-harmonic radiation is designated in FIG. 7 by double arrowheads 2H. Mirror $M_1$ of laser 50 is replaced in laser 60 with a mirror $M_5$ that is maximally reflective for fundamental radiation F and maximally transmissive for the 2H-radiation, and, accordingly serves as an output-coupling mirror for the 2H-radiation.

In this kind of frequency-conversion arrangement, it is preferable that the effective reflectivity difference of an interferometer in accordance with the present invention be greater than the percentage of fundamental radiation that is frequency-converted. By way of example, in an optically nonlinear crystal of LBO arranged for type-I conversion of 1064 nm-radiation to 532 nm-radiation, the percentage of fundamental radiation converted may be about 6%. In the example of the inventive interferometer described above, the effective-reflectivity difference of the input-output mirror 12 is only between about 4 and 5%. This should not be construed as suggesting that this is the maximum difference obtainable with the inventive interferometer, however, one way of overcoming any limit to the difference obtainable with one of the interferometers in a ring laser is to include more than such interferometer in the laser.

In laser 60, mirror $M_2$ of laser 50 is replaced by an interferometer 10A preceded by a half-wave plate 52 as described above, to allow active control. Interferometer 10A of laser 50 is replaced in laser 60 by and interferometer 10B in accordance with the present invention. Interferometer 10B is similar to interferometer 10A with an exception that mirror 12 of interferometer 10A is replaced by a mirror 12B that is partially reflective and partially transmissive for the fundamental radiation but highly reflective for the 2H radiation. As the polarization analysis scheme of polarization analyzer 54 can be particularly sensitive, it may be found advantageous to include a dichroic mirror 64 in interferometer, ahead of sampling mirror 18A, to attenuate any 2H radiation that is not reflected by mirror 12B, so that such radiation does not compromise the polarization analysis of the fundamental radiation.

It should be noted, here, that active control of any one of interferometers 10A and 10B is not affected by the active control of the other. This is because what is being analyzed to provide the active control is not what is going on in resonator 32, but what is going on in the interferometers, and then only as far as light-circulating in the desired direction is concerned.

Those skilled in the art will recognize without further illustration or detailed description, that one or more optically nonlinear crystals may be included in a ring laser in accordance with the present invention for converting the frequency of fundamental radiation to a frequency other than the second-harmonic frequency. By way of example, two optically nonlinear crystals may be used to provide third-harmonic (3H) or fourth-harmonic (4H) radiation, or a single optically nonlinear crystal may be configured for optical parametric conversion (frequency division) of fundamental radiation into two frequencies each of which is longer than the frequency of the fundamental radiation. Those skilled in the art will also recognize that a ring resonator in accordance with the present invention may be configured to accept any number of the inventive interferometers as may be needed to provide a total reflectivity difference for the two circulation directions of the resonator that is greater than the percentage of fundamental radiation that is frequency-converted.

Figure 8:
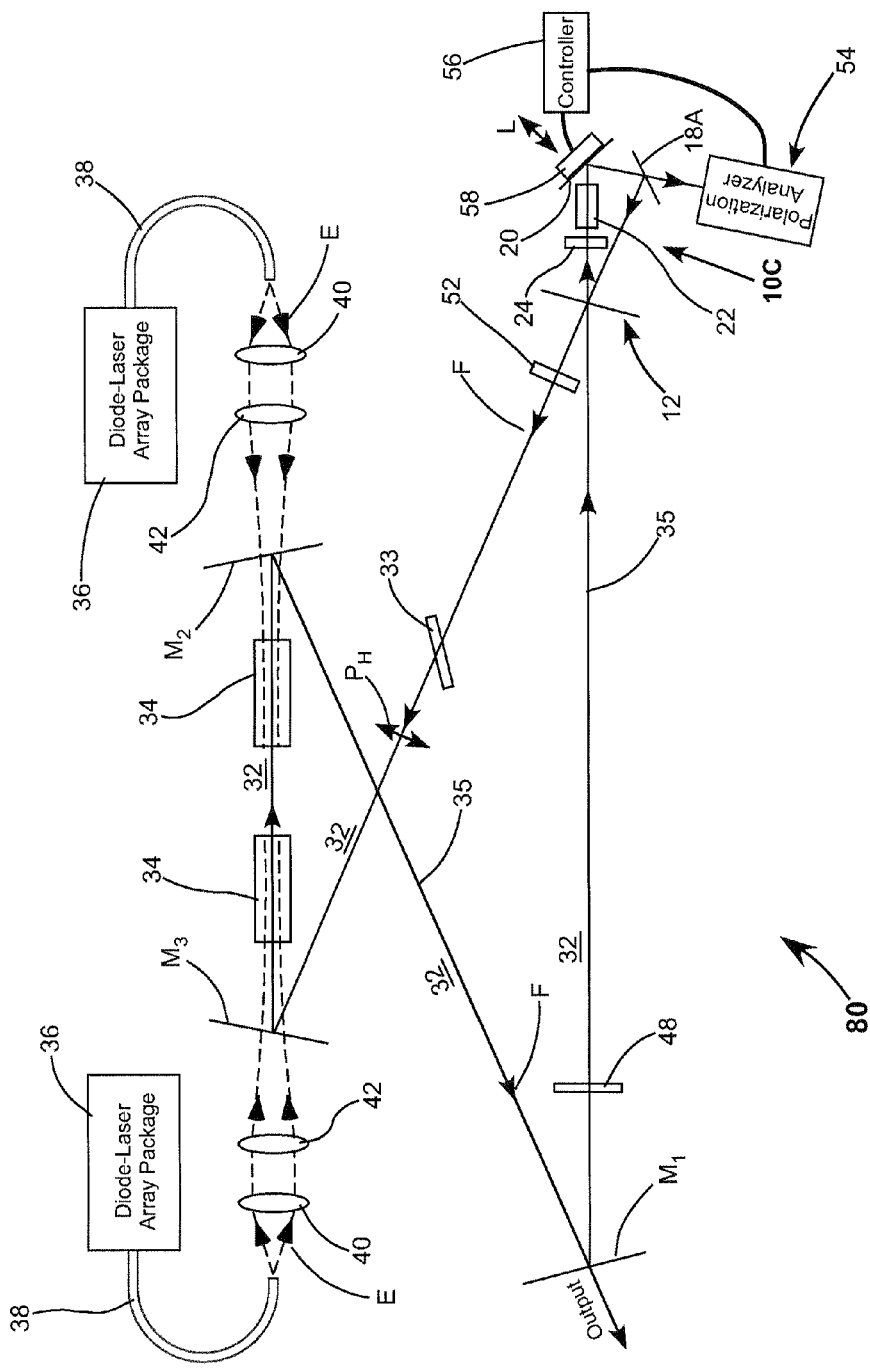
FIG. 8 schematically illustrates yet another preferred embodiment of an optical parametric oscillator in accordance with the present invention, similar to the laser of FIG. 4, but wherein the ring-interferometer is configured to cause circulation of radiation in the resonator in an opposite direction to that of FIG. 4.

FIG. 8 schematically illustrates yet another preferred embodiment 80 of a traveling-wave ring-laser in accordance with the present invention. Laser 80 is similar to laser 50 of FIG. 4 with an exception the interferometer 10A of laser 50 is replaced by an interferometer 10C configured in a manner that causes lasing in resonator 32 in an opposite direction to the lasing direction of laser 50. There is no polarization-tilt applied to the input to interferometer 10C.

Interferometer 10C is configured similarly to interferometer 10A with an exception that the polarization rotations imposed by half-wave plate 24 and Faraday-element 22 in interferometer 10C are different from those of either interferometer 10 of interferometer 10A. In interferometer 10C, if the Faraday element imposes a polarization-rotation of Φ-degrees in one direction, the slow-axis of half-wave plate is tilted in the opposite direction at Φ/2-degrees plus Φ-degrees. The Φ/2-degrees portion of the axis-tilt provides sufficient polarization-plane tilt to offset the polarization-plane tilt imposed by the Faraday-element. The Φ-degrees portion of the axis-tilt causes the interferometer to impose a net polarization-plane tilt, at output, of 2Φ-degrees. In resonator 32 of laser 80, half-wave plate 52 is at the output of the interferometer and is arranged to cancel the polarization-plane tilt imposed by the interferometer.

Figure 9:
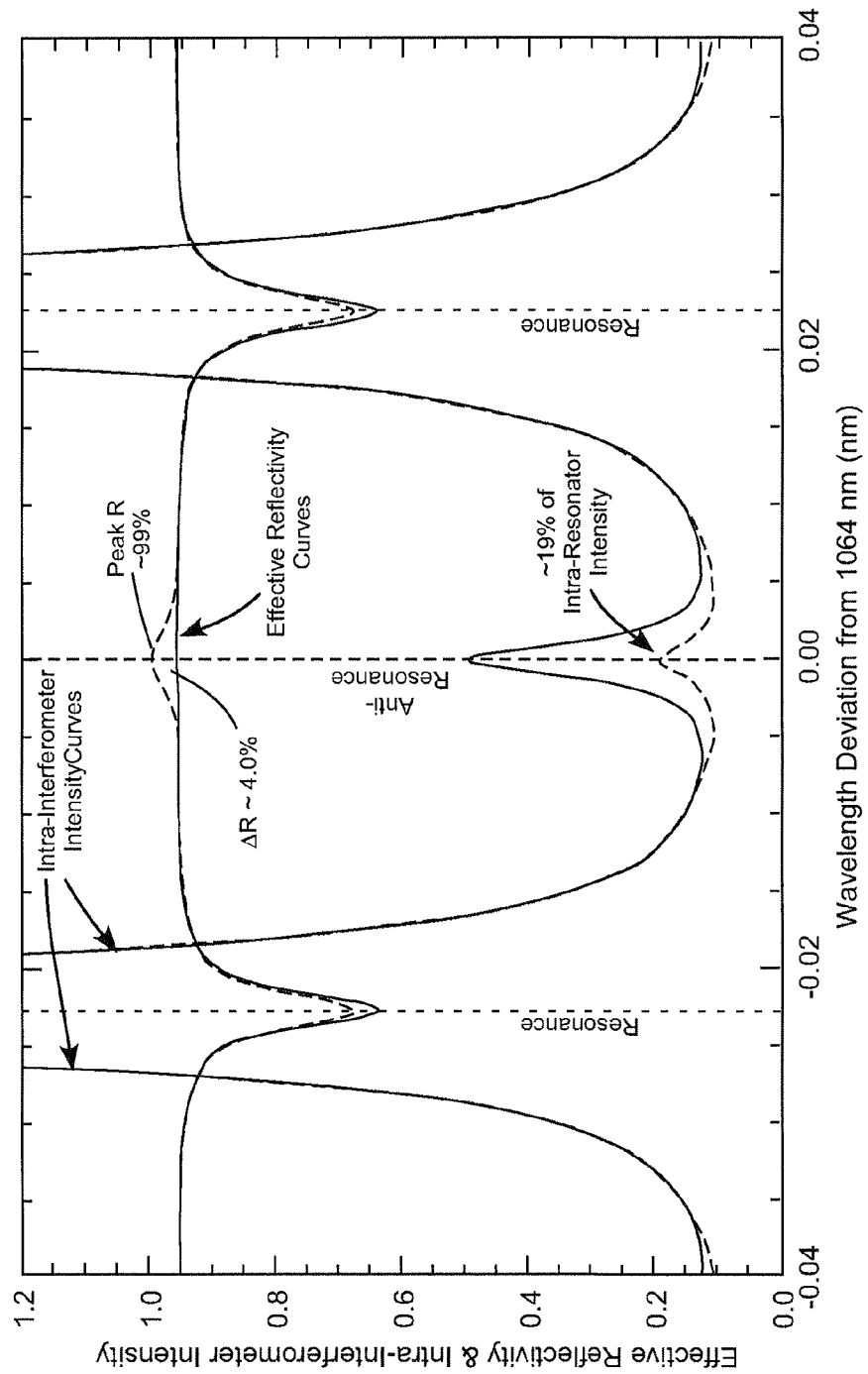
FIG. 9 is a graph schematically illustrating calculated intra-interferometer power and effective reflectivity of the input/output coupling mirror for clockwise and anticlockwise circulation in the interferometer, assuming 7% insertion loss for the magneto-optic element.

Calculated results of the above-described configuration of interferometer 10C are schematically illustrated in the graph of FIG. 9. The results for light circulating anticlockwise in the interferometer are depicted by solid curves. The results for light circulating clockwise in the interferometer are depicted by dashed curves.

In the calculation for the graph of FIG. 8, it is assumed that Faraday-element 22 is assumed to be TGG material providing 6° of polarization rotation in one direction, and that half-wave plate is adjusted to provide 18° of polarization rotation in the opposite direction. It assumed that there is 7% loss in the Faraday-element, and that mirror 12 (surface 14) has a reflectivity of 70% (0.7) and a transmission of 30% (0.3). The input intensity to the interferometer is assumed to be 1.0

It can be seen that in this case that, in an anti-resonant state of interferometer 10C, the effective reflectivity of mirror 12 for light circulating clockwise in the interferometer (anticlockwise in the resonator) is greater than the effective reflectivity for light circulating anticlockwise in the interferometer (clockwise in the resonator). This gives rise to the circulation direction in the resonator depicted in FIG. 8. In this case the reflectivity difference for the two directions of circulation is about 4% compared with the difference of 2% in the case of the graph of FIG. 3 wherein a 7% loss in the Faraday-element is assumed. The calculated intra-interferometer intensity, however, is about 19% of the input intensity compared with about 9% in the calculation of FIG. 3.

Those skilled in the art will recognize that there will be many different choices of relative polarization-plane rotation induced by half-wave plate 24 and Faraday-element 22 that will provide a difference in effective-reflectivity of mirror 12 for clockwise and counterclockwise circulation in resonator 32. Any such selection may provide a different reflectivity difference or different intra-interferometer intensity from those exemplified above. Results may also be influenced by selecting a different (actual) reflectivity and transmission for mirror 12. Any combination of relative polarization-rotations for Faraday-element 22 and half-wave plate 24 may be selected without departing from the spirit and scope of the present invention.

Further, those skilled in the art will recognize that a direction-sensitive interferometer in accordance with the present invention is not limited to the simple ring-interferometer described above. Principles of the interferometer are applicable to any interferometer that can be operated in an anti-resonant or non-resonant state.

In summary, the present invention is described above in terms of a preferred and other embodiments. The invention is not limited, however, to the embodiments described and depicted. Rather, the invention is limited only by the claims appended hereto.

What is claimed is:

1. A laser, comprising:
    a traveling-wave ring-resonator formed by a plurality of resonator mirrors and having first and second, opposite, possible circulation-directions for light circulating therein; and
    wherein a first of the plurality of resonator mirrors is one mirror of an interferometer including a plurality of interferometer mirrors and capable of being operated in an anti-resonant state and including a magneto-optic element and a polarization-rotating element arranged such that when the interferometer is operated at about the anti-resonant state, the first of the plurality of resonator mirrors has an effective reflectivity greater in the first circulation-direction of the resonator than in the second circulation-direction of the interferometer.

2. The laser of claim 1, wherein when the interferometer is in the anti-resonant state and when the resonator is operated, the difference between the first-direction reflectivity of the first resonator mirror and the second-direction effective reflectivity of the first resonator mirror is sufficient that, when the resonator is operated, light circulates therein in only the first circulation-direction, and light circulating in the interferometer has an intensity less than that of the light circulating in the resonator.

3. The laser of claim 1, wherein the first resonator mirror has an actual reflectivity of about 70% and an actual transmission of about 30% and wherein when the interferometer is in the anti-resonant state, the first resonator mirror has an effective reflectivity of about 99% or greater and the intensity of light circulating in the interferometer is about 10% of that of the light circulating in the resonator.

4. The laser of claim 1, wherein the interferometer is a ring-interferometer.

5. The laser of claim 1, wherein the interferometer includes an electro-optical arrangement for maintaining the interferometer in the anti-resonant condition.

6. The laser of claim 1, wherein the resonator includes an optically nonlinear crystal arranged to convert a fraction of the light circulating in the resonator to light having a different frequency.

7. The laser of claim 6, wherein, when the interferometer is in the anti-resonant state and when the resonator is operated, the difference between the first-direction reflectivity of the first resonator mirror and the second-direction effective reflectivity of the first resonator mirror is greater than the fraction of light converted to the different frequency and is sufficient that, when the resonator is operated, light circulates therein in only the first circulation-direction.

8. The laser of claim 1, wherein a second of the resonator mirrors is one mirror of a second interferometer including a plurality of interferometer mirrors and capable of being operated in an anti-resonant state and including a magneto-optic element and a polarization-rotating element arranged such that when the interferometer is operated at about the anti-resonant state, the second of the plurality of resonator mirrors has an effective reflectivity greater in the first circulation-direction of the resonator than in the second circulation-direction of the interferometer.

9. The laser of claim 8, wherein the resonator includes an optically nonlinear crystal arranged to convert a fraction of the light circulating in the resonator to light having a different frequency.

10. The laser of claim 9, wherein, when the interferometer is in the anti-resonant state and when the resonator is operated, the combined differences between the first-direction reflectivity of the first and second resonator mirrors and the second-direction effective reflectivity of the first and second resonator mirrors is greater than the fraction of light converted to the different frequency and is sufficient that, when the resonator is operated, light circulates therein in only the first circulation-direction.

11. A laser, comprising:
a traveling-wave ring-resonator formed by a plurality of resonator mirrors and having clockwise and anticlockwise possible circulation-directions for light circulating therein, the resonator being arranged such that light circulating therein is plane polarized in a selected polarization-orientation;
a ring interferometer capable of being operated in an anti-resonant state and including a plurality of mirrors one of which is a first of the plurality of resonator mirrors and serves as an input and output mirror of the interferometer, with clockwise circulating light in the resonator circulating anticlockwise in the interferometer and vice-versa, the interferometer further including a magneto-optic element and a first polarization-rotating element arranged such that when the interferometer is operated at about the anti-resonant state, the first of the plurality of resonator mirrors has an effective reflectivity greater in one of the possible circulation directions than in the other, with the arrangement of the magneto-optic element and the first polarization-rotating element causing the first resonator mirror to rotate the polarization-plane of light reflected therefrom; and
wherein a second polarization-rotating element is positioned with the resonator and arranged to cancel the polarization-plane rotation introduced by the first mirrors.

12. The laser of claim 11, wherein light for light circulating in the clockwise direction in the resonator the second polarization-rotating element is positioned at the input to the interferometer and light circulating anticlockwise in the resonator traverses the magneto-optic element and the first polarization-rotating element in sequence.

13. The laser of claim 11, wherein light for light circulating in the anticlockwise direction in the resonator the second polarization-rotating element is positioned at the output of the input to the interferometer and light circulating clockwise in the resonator traverses the first polarization-rotating element and magneto-optic element in sequence.

14. A unidirectional ring laser comprising:
a primary ring resonator defined by at least three mirrors;
a gain medium located within the resonator;
means for pumping the gain medium to generate fundamental radiation; and
a secondary ring resonator defined by at least three mirrors, and wherein one of the mirrors of the primary ring resonator defines one of the mirrors of the secondary ring resonator, said one mirror being partially transmissive to the fundamental radiation and wherein the secondary ring resonator includes a magneto-optic element and a polarization-rotating element configured to impart different amounts of polarization rotation to the radiation circulating in the secondary ring resonator depending upon the direction of travel of the radiation within the secondary ring resonator so that the effective reflectivity of said one mirror is greater for radiation travelling about the primary ring resonator in one direction than in the other direction so that radiation travelling in said other direction is suppressed.

15. A laser as recited in claim 14, wherein the secondary ring resonator is configured so that no more than fifty percent of the power circulating in the primary ring resonator circulates in the second ring resonator.

16. A laser as recited in claim 14, wherein said magneto-optical element is a Faraday rotator and said polarization rotating element is a half-wave plate.

17. A laser as recited in claim 16, wherein said secondary ring resonator is operated in an anti-resonant condition.

18. A laser as recited in claim 17, further including an active control system for monitoring and adjusting the secondary ring resonator to maintain the anti-resonant condition.

* * * * *